United States Patent
Stumbe et al.

(10) Patent No.: US 7,148,293 B2
(45) Date of Patent: Dec. 12, 2006

(54) METHOD FOR THE PRODUCTION OF HYPERBRANCHED WATER-SOLUBLE POLYESTERS

(75) Inventors: Jean-Francois Stumbe, Strasbourg (FR); Bernd Bruchmann, Freinsheim (DE); Dietmar Häring, Schriesheim (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 10/525,752

(22) PCT Filed: Jul. 24, 2003

(86) PCT No.: PCT/EP03/08088

§ 371 (c)(1),
(2), (4) Date: Feb. 25, 2005

(87) PCT Pub. No.: WO2004/020503

PCT Pub. Date: Mar. 11, 2004

(65) Prior Publication Data

US 2005/0250914 A1 Nov. 10, 2005

(30) Foreign Application Priority Data

Aug. 30, 2002 (DE) .................. 102 40 817

(51) Int. Cl.
*C08F 20/00* (2006.01)
*C08F 63/66* (2006.01)

(52) U.S. Cl. ............ 525/437; 528/274; 528/275; 528/300; 528/302; 528/308; 528/308.6; 525/438; 525/445; 524/700; 524/801

(58) Field of Classification Search ........ 528/274, 528/275, 300, 302, 308, 308.6; 525/437, 525/438, 445; 524/700, 801
See application file for complete search history.

(56) References Cited

U.S. PATENT DOCUMENTS

| 2,807,606 | A | * | 9/1957 | Lincoln | ............... 528/301 |
|---|---|---|---|---|---|
| 4,983,712 | A | * | 1/1991 | Meixner et al. | ............ 528/272 |
| 5,096,938 | A | * | 3/1992 | Beck et al. | ............... 522/100 |
| 5,280,054 | A | | 1/1994 | Sakai et al. | |
| 6,093,777 | A | * | 7/2000 | Sorensen et al. | ........... 525/438 |
| 6,620,893 | B1 | * | 9/2003 | Melchiors et al. | .......... 525/440 |
| 6,646,049 | B1 | * | 11/2003 | Ramesh | ............... 525/111 |
| 2005/0054812 | A1 | * | 3/2005 | Wagner et al. | ............. 528/272 |
| 2005/0165177 | A1 | * | 7/2005 | Wagner et al. | ............. 525/437 |

FOREIGN PATENT DOCUMENTS

| CA | 2010012 | | 8/1990 |
|---|---|---|---|
| DE | 10163163 A | | 12/2001 |
| EP | 0 279 303 A2 | | 8/1988 |
| EP | 0 383 118 A2 | | 8/1990 |
| GB | 2 259 514 | * | 3/1993 |
| GB | 2 259 514 A | | 3/1993 |
| JP | 2001316466 | | 11/2001 |
| WO | WO-9317060 A1 | | 9/1992 |
| WO | WO-03054204 A1 | | 7/2003 |
| WO | WO-03093343 A | | 11/2003 |

OTHER PUBLICATIONS

Frey et al., Controlling the Growth of Polymer Trees: Concepts and Perspectives for Hyperbranched Polymers. Chem. Eur. J. 2000. 6(14):2499-2506. Weinheim, Deutschland.
International Search Report: PCT/EP03/08088. Nov. 17, 2003.
Faber, Biotransformation in Organic Chemistry: Ch. 3.2 Immobilization, 1997, vol. 3, pp. 345-356.

* cited by examiner

*Primary Examiner*—Samuel A. Acquah
(74) *Attorney, Agent, or Firm*—Connolly Bove Lodge & Hutz LLP

(57) ABSTRACT

Process for preparing essentially uncrosslinked hyperbranched, water-soluble or water-dispersible polyesters from dicarboxylic acids and polyether polyols having at least 3 OH groups. Water-soluble hyperbranched polyesters which are obtainable by such a process and their use for producing printing inks, adhesives, coatings, paints and varnishes.

29 Claims, No Drawings

METHOD FOR THE PRODUCTION OF HYPERBRANCHED WATER-SOLUBLE POLYESTERS

The present invention relates to a process for preparing essentially uncrosslinked hyperbranched, water-soluble or water-dispersible polyesters from dicarboxylic acids and polyether polyols having at least 3 OH groups. It further relates to water-soluble or water-dispersible hyperbranched polyesters which are obtainable by such a process, and also to the use of such water-soluble polyesters for preparing polyaddition or polycondensation polymers and for producing printing inks, adhesives, coatings, paints and varnishes.

Dendrimers, arborols, starburst polymers or hyperbranched polymers are terms used to refer to polymeric structures which have a branched structure and a high functionality.

Dendrimers are molecularly uniform macromolecules having a highly symmetric structure. Owing to the high functionality and the highly symmetric structure, they have many interesting properties. The use of dendrimers has been proposed in a variety of industrial fields. However, dendrimers have to be synthesized in multistage syntheses starting from a central starter molecule and are therefore very expensive. Accordingly, their industrial use is restricted to special cases in the high-price sector. For wider use, more economical alternatives to dendrimers are necessary.

In contrast to dendrimers, hyperbranched polymers are both molecularly and structurally nonuniform. They have branches which have both different lengths and different degrees of branching.

The term "hyperbranched polymers" is explained, for example, in Sunder et al., Chem. Eur. J. 2000, 6, No. 14, pages 2499 to 2506, and in the references cited therein. The article also gives typical examples of this class of polymers.

The term "hyperbranched" does not mean simply a high degree of branching of the polymer. Rather, hyperbranched polymers have a particularly regular arrangement of branching points. Monomers suitable for synthesizing hyperbranched polymers are, in particular, $AB_x$ monomers. These have two different functional groups A and B which can react with one another to form a link. The functional group A is present only once in each molecule and the functional group B is present two or more times. Reaction of these $AB_x$ monomers with one another gives uncrosslinked polymers having a regular arrangement of branching points. The polymers have virtually exclusively B groups at the ends of the chains.

FIG. 1 shows a typical example of a hyperbranched polymer which is obtainable by reaction of an $AB_2$ monomer.

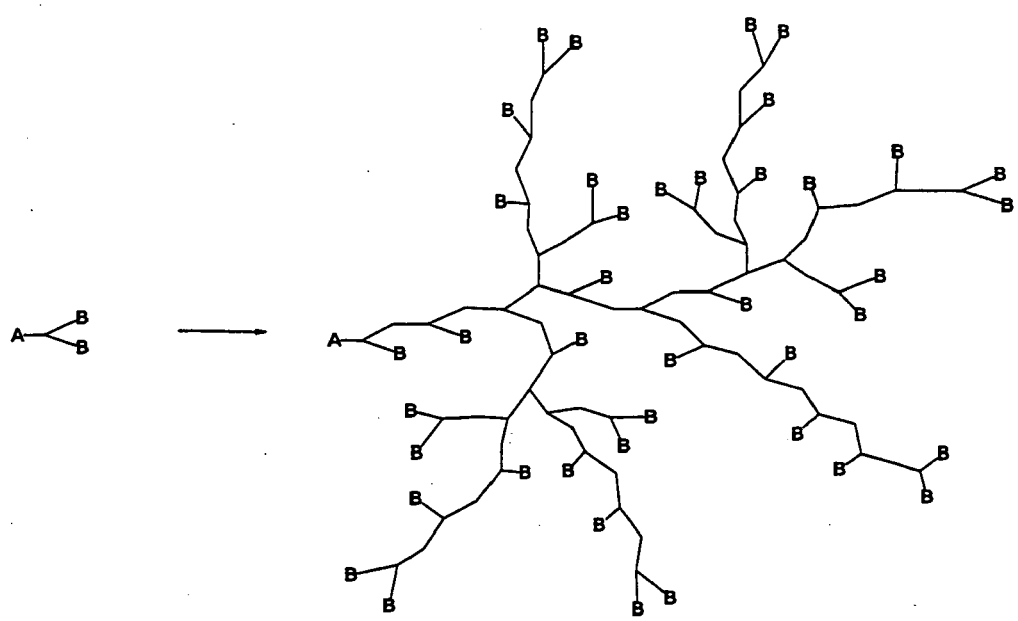
Fig. 1 Schematic synthesis of hyperbranched polymers from $AB_2$ monomers.

WO 93/17060 discloses a process for preparing dendritic polyesters. A polyol as starter molecule, e.g. trimethylolpropane, is reacted with dimethylolpropionic acid in such an amount that a dendrimer of the 1st generation is formed. Dendrimers of higher generations are formed by stepwise addition of dimethylolpropionic acid. The polyester obtained can subsequently be functionalized further. Regardless of whether the process is single-stage or multistage, dimethylolpropionic acid is expensive and the process allows little flexibility.

Our own, as yet unpublished patent applications having the numbers DE 101 63 163.4 and DE 102 195 08.0 disclose processes for preparing hyperbranched polyesters by means of enzymatic or acid catalysis. As an alternative to the synthesis from $AB_x$ molecules, the $A_2+B_x$ strategy is also disclosed. $AB_x$ molecules are formed in situ from dicarboxylic acids $A_2$ and polyols $B_x$ and these form hyperbranched polyesters. However, the polymers disclosed are not water-soluble and are thus unsuitable for use in aqueous systems. Polyether polyols as OH components are not disclosed.

Polyesters comprising polyether polyols as building block have been disclosed a number of times.

U.S. Pat. No. 4,983,712 discloses the preparation of radiation-curable polyesters from a mixture of terephthalic acid, adipic acid and, if desired, further dicarboxylic acids and, as other reactant, a mixture of an ethoxylated triol or polyol and a nonethoxylated diol in excess. The product obtained is functionalized further by means of acrylic acid. The reaction is carried out in the melt at 180° C.–250° C. However, the high reaction temperature leads to undesirable secondary reactions such as dehydration, intermolecular crosslinking and to discoloration of the product.

EP-A 383 118 discloses the preparation of crosslinkable polyesters having (meth)acryl groups from unsaturated dicarboxylic acids, at least one ether alcohol which can have from 1 to 4 OH groups and (meth)acrylic acid.

EP-A 279 303 discloses the preparation of radiation-curable acrylates by reaction of alkoxylated, 2–6-hydric alcohols, 2–4-basic carboxylic acids and acrylic or methacrylic acid followed by reaction of the excess carboxyl groups with epoxides.

GB-A 2 259 514 discloses the preparation of a polyester for improving the water-wettability of articles from a mixture of a (poly)ether diol and a (poly)ether polyol, with the proportion of the diol in the mixture being from 30 to 95% by weight, and, as other reactant, a mixture of aliphatic and alicyclic dicarboxylic or polycarboxylic acids.

The polyesters comprising polyether polyol units disclosed in the documents mentioned can also have branches. However, none of the documents indicates the conditions necessary to obtain essentially uncrosslinked and hyperbranched, i.e. having a regular branching structure, water-soluble or water-dispersible polyesters.

It is an object of the present invention to provide an economical process for preparing essentially uncrosslinked, water-soluble or water-dispersible hyperbranched polyesters from simple monomers. Furthermore, the process should have high flexibility in order to optimally match the properties of the water-soluble or water-dispersible hyperbranched polyesters to particular applications in a simple way. A further object is to provide novel water-soluble or water-dispersible hyperbranched polyesters and to provide for their use for preparing polyaddition or polycondensation polymers and for producing printing inks, adhesives, paints and varnishes and coatings.

We have found that this object is achieved by a process for preparing essentially uncrosslinked hyperbranched, water-soluble or water-dispersible polyesters, which comprises reacting
  at least one dicarboxylic acid or a dicarboxylic acid derivative (A) with
  at least one polyether polyol (B) having n OH groups, where n is $\geq 3$,
at from 60° C. to 160° C. in the presence of an esterification catalyst, where the components (A) and (B) are used in such amounts that the molar ratio of OH groups to COOH groups is from 2:1 to 1:2.

In a further aspect of the invention, we have found water-soluble or water-dispersible hyperbranched polyesters which are obtainable by the process indicated.

In a third aspect of the invention, we have found the use of the water-soluble or water-dispersible, hyperbranched polyesters for producing printing inks, adhesives, coatings, paints and varnishes.

The following details may be provided in respect of the invention.

The hyperbranched and water-soluble or water-dispersible polyesters of the present invention are hyperbranched polymers in the strict sense, i.e. molecularly and structurally nonuniform polymers. Molecularly and structurally uniform dendrimers as defined at the outset do not come within the scope of the invention.

To carry out the process of the present invention, it is not necessary to synthesize $AB_x$ molecules, but instead the corresponding structural units are generated in situ from $A_2$ and $B_x$ molecules.

The synthesis is carried out using at least one dicarboxylic acid (A) or a suitable derivative thereof. Of course, it is also possible to use mixtures of various dicarboxylic acids or derivatives. The choice of the derivative is not restricted, provided that the reaction is not adversely affected thereby.

Suitable derivatives are, in particular, the relevant anhydrides in monomeric or polymeric form or monoalkyl or dialkyl esters, preferably methyl or ethyl esters or mixed methyl ethyl esters.

Examples of dicarboxylic acids (A) include saturated aliphatic dicarboxylic acids such as malonic acid, succinic acid, glutaric acid, adipic acid, pimelic acid, suberic acid, azelaic acid, sebacic acid, dodecane-α,ω-dicarboxylic acid and alicyclic carboxylic acids such as 1,2-, 1,3- or 1,4-cyclohexanedicarboxylic acid or cyclopentane-1,2-dicarboxylic acid. The dicarboxylic acids mentioned may also be substituted, for example by one or more radicals such as alkyl groups, in particular $C_{1-10}$-alkyl groups, cycloalkyl groups, alkylene groups such as methylene or ethylidene or aryl groups, in particular $C_{6-14}$-aryl groups.

Further examples of dicarboxylic acids (A) include ethylenically unsaturated acids such as maleic acid and fumaric acid and also aromatic dicarboxylic acids such as phthalic acid, isophthalic acid or terephthalic acid.

Preferred dicarboxylic acids (A) are aliphatic dicarboxylic acids, in particular succinic acid, glutaric acid and adipic acid, or their monomethyl or dimethyl esters. Further preference is given to phthalic acid, isophthalic acid and terephthalic acid and their monomethyl or dimethyl esters. Very particular preference is given to adipic acid.

As second component for the synthesis, use is made of a polyether polyol (B) having n OH groups, where n is a natural number greater than or equal to 3. n is preferably 3, 4, 5 or 6 and particularly preferably 3 or 4.

Of course, it is also possible to use mixtures of various polyether polyols.

Examples of suitable polyether polyols include oligoglycerols having a degree of polymerization of from 2 to 50, preferably from 2 to 7 and particularly preferably from 2 to 4.

Further examples include polyether polyols which are obtainable by ethoxylation and/or propoxylation of compounds having at least 3 groups which contain acidic H atoms. Preference is given to ethoxylation.

Examples of compounds having at least 3 groups containing acidic H atoms include alcohols, in particular saturated alcohols, which have at least 3 OH groups, e.g. glycerol, trimethylolethane, trimethylolpropane, ditrimethylolpropane or pentaerythritol. However, it is also possible to use suitable amines or amino alcohols, for example diethanolamine, dipropanolamine, diisopropanolamine, triethanolamine, tris(hydroxymethyl)aminomethane or diisopropylethanolamine.

The degree of ethoxylation is usually from 0.1 to 10 ethylene oxide units per OH group or group having an acidic H. Preference is given to from 1 to 6 and particularly preferably from 2 to 5 units. The number average molecular weight $M_n$ of the polyether polyols used is usually from 100 to 1000 g/mol. Preference is given to using ethoxylated trimethylolpropane, ethoxylated glycerol or ethoxylated pentaerythritol. Star-shaped molecules having at least 3 arms comprising PPO-PEO blocks are also suitable.

According to the present invention, the components (A) and (B) are reacted in such an amount that the molar ratio of the OH groups to the COOH groups is from 2:1 to 1:2. If the ratio mentioned is greater than the upper limit or smaller than the lower limit, water-soluble or water-dispersible, hyperbranched polymers of sufficient quality are generally no longer obtained. This does not rule out the possibility of hyperbranched polymers of satisfactory quality being able to be obtained in specific cases when the ratio is slightly below or above the limits specified.

The molar ratio of OH groups to COOH groups is preferably from 1.8:1 to 1:1.8, particularly preferably from 1.5:to 1:1.5 and very particularly preferably from 1.25:1 to 1:1.25.

In the process of the present invention, use can optionally also be made of diols as chain extenders (V). Chain extenders make it possible to lengthen the arms of $AB_x$ units. An example which may be mentioned is an $AVAB_x$ unit. Chain extenders can be used to make fine adjustments in the desired properties of the polymer. For example, the gel point or the density of the functional groups of the molecule can be influenced thereby.

The amount of an optionally added chain extender (V) should in general not exceed 40 mol % of the amount of polyether polyol used. The amount preferably does not exceed 20 mol %. Furthermore, the amount is calculated so that the OH/COOH ratio mentioned above is still adhered to when the OH groups of (V) are taken into account.

Examples of diols suitable as chain extenders (V) include ethylene glycol, 1,2-propanediol, 1,3-propanediol, 1,2-butanediol, 1,3-butanediol, 1,4-butanediol, 2,3-butanediol, 1,2-pentanediol, 1,3-pentanediol, 1,4-pentanediol, 1,5-pentanediol, 2,3-pentanediol, 2,4-pentanediol, 1,2-hexanediol, 1,3-hexanediol, 1,4-hexanediol, 1,5-hexanediol, 1,6-hexanediol, 2,5-hexanediol, 1,2-heptanediol, 1,7-heptanediol, 1,8-octanediol, 1,2-octanediol, 1,9-nonanediol, 1,10-decanediol, 1,2-decanediol, 1,12-dodecanediol, 1,2-dodecanediol, 1,5-hexadiene-3,4-diol, cyolopentanediols, cyclohexanediols, inositol and derivatives thereof (2)-methyl-2, 4-pentanediol, 2,4-dimethyl-2,4-pentanediol, 2-ethyl-1,3-hexanediol, 2,5-dimethyl-2,5-hexanediol, 2,2,4-trimethyl-1,3-pentanediol, pinacol, diethylene glycol, triethylene glycol, dipropylene glycol, tripropylene glycol, polyethylene glycols $HO(CH_2CH_2O)_n$—H or polypropylene glycols $HO(CH[CH_3]CH_2O)_n$—H or mixtures of two or more representatives of the abovementioned compounds, where n is an integer and n=4. Preference is given to ethylene glycol, 1,2-propanediol and diethylene glycol, triethylene glycol, dipropylene glycol and tripropylene glycol.

To make a fine adjustment in the properties of the hyperbranched polymer, it is also possible to add a chain stopper (S). A chain stopper is a monofunctional alcohol or a monofunctional carboxylic acid. These can react with the reactive functional end groups of the growing hyperbranched polymer and serve to make a fine adjustment in the properties, for example to limit the molecular weight. It is also possible to use mixtures of various alcohols as chain stoppers or mixtures of various carboxylic acids as chain stoppers. The use of a mixture of alcohols and carboxylic acids is generally not advisable, even though it should not be ruled out absolutely for specific cases.

The amount of the optionally added chain stoppers should generally not exceed 10 mol % of the amount of (A) in the case of monocarboxylic acids or (B) for the case of monoalcohols. Preference is given to using not more than 5 mol %. Furthermore, the amount is calculated so that the OH/COOH ratio mentioned above is still adhered to when the OH or COOH groups of (S) are taken into account.

Examples of monocarboxylic acids which can be used as chain stoppers (S) include high-boiling straight-chain or branched saturated monocarboxylic acids, in particular $C_{6-20}$-carboxylic acids such as hexanoic acid, 2-ethylhexanoic acid, octanoic acid, decanoic acid, dodecanoic acid, lauric acid, palmitic acid or stearic acid. The carboxylic acids can be used as such or in the form of derivatives. The choice of derivatives is not restricted, provided that the reaction is not adversely affected thereby. Suitable derivatives are, in particular, the corresponding anhydrides in monomeric or polymeric form or alkyl esters, preferably methyl or ethyl esters.

Examples of suitable monoalcohols include high-boiling alcohols such as benzyl alcohol, 1-dodecanol, 1-tetradecanol, 1-hexadecanol, glycol monoalkyl ethers such as glycol monoethyl ether or polyethylene glycol monoalkyl ethers, e.g. polyethylene glycol monoethyl ether.

In the process of the present invention, the components (A) and (B) and, if present, (V) and/or (S) are reacted in the presence of an esterification catalyst. The reaction temperature is generally from 40 to 160° C. Outside this temperature range, it is generally the case that essentially uncrosslinked, water-soluble or water-dispersible, hyperbranched polyesters of the quality necessary for the applications according to the invention are no longer obtained, even when this may be the case in exceptional circumstances.

Examples of suitable esterification catalysts include acidic inorganic, organometallic or organic catalysts.

Examples of acidic inorganic catalysts include sulfuric acid, phosphoric acid, phosphonic acid, hypophosphorus acid, aluminum sulfate hydrate, alum, acidic silica gel (pH=6, in particular=5) and acidic aluminum oxide. Furthermore, aluminum compounds of the formula $Al(OR)_3$ and titanates of the formula $Ti(OR)_4$, for example, can also be used as acidic inorganic catalysts. Here, the radicals R can be identical or different and are selected independently from among $C_{1-10}$-alkyl radicals. It is preferred that the radicals R in Al(OR)$_3$ or Ti(OR)$_4$ are in each case identical and are selected from among isopropyl and 2-ethylhexyl.

Preference is given to acidic organometallic catalysts selected, for example, from among dialkyltin oxides R$_2$SnO, where R is as defined above. A particularly preferred representative of acidic organometallic catalysts is di-n-butyltin oxide, which is commercially available as oxo tin.

Preferred acidic organic catalysts also include acidic organic compounds having, for example, phosphate groups, sulfonic acid groups, sulfate groups or phosphonic acid groups. Particular preference is given to sulfonic acids such as para-toluenesulfonic acid. It is also possible to use acidic ion exchangers as acidic organic catalysts, for example polystyrene resins which are crosslinked with, for instance, 2 mol % of divinylbenzene and contain sulfonic acid groups.

Of course, combinations of two or more of the above-mentioned catalysts can also be used, provided that the combination results in no undesirable properties. It is also possible to use organic or organometallic or inorganic catalysts which are present in the form of discrete molecules in immobilized form. The amount of such acidic esterification catalysts is usually from 0.1 to 10% by weight, preferably from 0.2 to 2% by weight, of catalyst based on the sum of (A) and (B) and, if used, (V) and/or (S).

The esterification catalyst can also be an enzyme. Preference is given to using lipases or esterases. Well-suited lipases and esterases are *Candida cylindracea, Candida lipolytica, Candida rugosa, Candida antarctica, Candida utilis, Chromobacterium viscosum, Geotrichum viscosum, Geotrichum candidum, Mucor javanicus, Mucor mihei*, pig pancreas, *Pseudomonas* spp., *Pseudomonas fluorescens, Pseudomonas cepacia, Rhizopus arrhizus, Rhizopus delemar, Rhizopus niveus, Rhizopus oryzae, Aspergillus niger, Penicillium roquefortii, Penicillium camembertii* or esterases of *Bacillus* spp. and *Bacillus thermoglucosidasius*. Particular preference is given to *Candida antarctica* lipase B. The enzymes mentioned are commercially available, for example from Novozymes Biotech Inc., Denmark.

The enzyme is preferably used in immobilized form, for example on silica gel or Lewatit®. Methods of immobilizing enzymes are known per se, for example from Kurt Faber, "Biotransformations in Organic Chemistry", 3rd edition 1997, Springer Verlag, chapter 3.2 "Immobilization", page 345–356. Immobilized enzymes are commercially available, for example from Novozymes Biotech Inc., Denmark.

The amount of immobilized enzyme used is usually from 0.1 to 20% by weight, in particular 10–15% by weight, based on the sum of (A) and (B) and, if used, (V) and/or (S).

The process of the present invention can be carried out by simply heating (A) and (B) and, if desired, (V) and (S) with the esterification catalyst to the desired temperature. However, the process can also be carried out in the presence of a solvent. Suitable solvents include, in particular, hydrocarbons such as high-boiling paraffins or aromatics. Examples which may be mentioned are toluene, ethylbenzene and xylene. The amount of solvent will be determined by a person skilled in the art depending on the desired reaction conditions.

The process of the present invention can be carried out in the presence of a water-withdrawing agent as additive which is added at the start of the reaction. Examples of suitable additives of this type are, for example, molecular sieves, in particular 4Å molecular sieves, MgSO$_4$ and Na$_2$SO$_4$. Further water-withdrawing agent can also be added during the reaction or water-withdrawing agent can be replaced by fresh water-withdrawing agent.

It is particularly advantageous to distill off water formed or alcohol formed (when using esters). To avoid solvent losses, it is also advisable to separate off water from the solvent, for example by means of a water separator, and to return the solvent which has been freed of water to the reaction mixture. To remove water of reaction formed as efficiently as possible, it is generally advisable to carry out the reaction under reduced pressure. In a preferred embodiment, the reaction is carried out at a pressure of less than 500 mbar.

The most advantageous conditions for the reaction also depend on the type of catalyst used. If an enzyme is used, it is generally advisable to use a solvent. An example of a solvent which has been found to be useful is toluene. Furthermore, the preferred temperature in this variant is from 40 to 120° C. Particular preference is given to from 50 to 80° C., very particularly preferably from 65 to 75° C. Preference is given to a pressure of from 100 to 500 mbar, particularly preferably from 150 to 350 mbar, for carrying out the reaction.

If acidic inorganic, organometallic or organic esterification catalysts are used, the process can be carried out particularly advantageously without additional solvent. The preferred temperature in this variant of the reaction is from 60 to 160° C. Particular preference is given to from 80 to 150° C. In this variant, the reaction is preferably carried out at a pressure of less than 100 mbar, particularly preferably from 10 to 80 mbar. intensive mixing of the reaction mixture is advisable in both variants.

In many cases, the hyperbranched, water-soluble or water-dispersible polyesters obtained by means of the process of the present invention can advantageously be used without further work-up. Residues of solid catalysts can, if appropriate after addition of solvent, be removed by filtration and the solvent can subsequently be taken off again under reduced pressure. If desired, the polymers can be purified by methods known in principle to a person skilled in the art of polymers, for example by reprecipitation.

Depending on the ratio of components (A) and (B) used, the water-soluble or water-dispersible, hyperbranched polyesters formed by the process have terminal OH groups, terminal COOH groups or both terminal OH groups and terminal COOH groups. In addition, they also have lateral OH and/or COOH groups (cf. FIG. 1). If carboxylic esters have been used as starting material, the end groups are of course not free COOH groups but COOR groups. Entirely or predominantly OH-terminated polymers are obtained by using 1 mol of polyether polyol (B) per mole of dicarboxylic acid (A). Entirely or predominantly COOH-terminated polymers are obtained by using (n−1) mol of the dicarboxylic acid (A) per mol of (B) having n OH groups.

In a further variant of the invention, the hyperbranched polyesters can be reacted further with a suitable functionalization reagent (F) which can react either with the terminal OH groups or the terminal COOH groups or generally with COOH and OH groups. In this way, end groups which precisely match the intended use of the hyperbranched polymer can be built into the hyperbranched polymer. The functionalization is preferably carried out directly after the polymerization without further work-up of the hyperbranched polymer. However, it can of course also be carried out only after isolation and/or work-up of the hyperbranched polymer in an additional step.

Functionalization reagents which are particularly suitable for the functionalization are one or more compounds selected from the group consisting of aliphatic and aromatic monocarboxylic acids and their derivatives, aliphatic and aromatic unsaturated monocarboxylic acids and their derivatives, aliphatic and aromatic monoalcohols, aliphatic and aromatic unsaturated monoalcohols, aliphatic and aromatic monoamines, aliphatic and aromatic unsaturated monoamines, aromatic and aliphatic monoisocyanates, aliphatic and aromatic unsaturated monoisocyanates, compounds containing carbodiimide groups and compounds containing epoxide groups.

Some possible ways of carrying out a subsequent functionalization are indicated below by way of example, without the invention being restricted to the examples mentioned.

COOH groups still present can be reacted with diols, for example ethylene glycol, to give products having essentially only OH groups. It has been found to be useful to use the diols in excess and to separate off the residual diols after the reaction.

Conversely, OH groups still present can be reacted with dicarboxylic acids such as malonic acid, succinic acid, glutaric acid or adipic acid, in particular in the form of their anhydrides, to give polymers having essentially only COOH groups.

Esterified end groups can be produced in a targeted manner by means of monoalcohols such as methanol, ethanol, propanol or long-chain aliphatic monoalcohols, e.g. stearyl alcohol, or, alternatively, monocarboxylic acids such as acetic acid, propionic acid or stearic acid.

It is also possible to use unsaturated monocarboxylic acids or unsaturated monoalcohols, for example (meth) acrylic acid, crotonic acid, oleic acid, linoleic acid, linolenic acid, vinyl alcohol, hydroxyethyl (meth)acrylate, hydroxypropyl (meth)acrylate or natural oils such as linseed oils or sunflower oils, as (F). This gives polymers which are used, in particular, in radiation-curing systems.

If the functionalization is, as indicated, based on an esterification reaction, it is particularly advisable not to carry out a work-up prior to the functionalization or else to reintroduce the esterification catalysts mentioned at the outset. In the case of functionalization agents (F) having unsaturated groups, it is also generally advisable to carry out the functionalization reaction only under mild reaction conditions. In the case of enzymes as catalysts, it is advisable to work at from 20 to 80° C., preferably from 40 to 70° C. In the case of acidic catalysts, the preferred temperature is from 20 to 100° C., particularly preferably from 40 to 80° C. In both cases, the additional use of an inhibitor to prevent free-radical polymerization is advisable. In the case of saturated alcohols or carboxylic acids, the temperatures used in the polymerization can be maintained.

Further examples include the introduction of terminal amino groups, for example by reaction of COOH end groups with diamines or polyamines such as ethylenediamine or diethylenetriamine, or the reaction of OH groups with aliphatic or aromatic diisocyanates to produce isocyanate end groups.

The water-soluble or water-dispersible hyperbranched polyesters of the present invention have a molecular weight $M_n$ of from 300 to 15 000 g/mol, preferably from 500 to 10 000 g/mol, particularly preferably from 500 to 8000 g/mol.

The polydispersity $M_w/M_n$ is generally from 1.1 to 50, preferably from 1.2 to 40, particularly preferably from 1.2 to 20.

The hydroxyl numbers of the polyesters of the present invention are generally from 50 to 1000 mg KOH/g and preferably from 100 to 800 mg KOH/g.

The acid numbers are generally from 0 to 200 mg KOH/g and preferably from 1 to 100 mg KOH/g.

The polyesters generally have good to very good solubility in water, i.e. clear solutions containing up to 50% by weight, in some cases even as high as 80% by weight, of the polyesters of the present invention in water can be produced, without gel particles being visible to the naked eye.

In a further embodiment, somewhat less hydrophilic polyesters which are no longer water-soluble but very readily water-dispersible can be prepared. Here, stable dispersions having solids contents of up to 50% by weight can be obtained.

In general, the hyperbranched polyesters of the present invention are also readily soluble in alcohols or aqueous solvent mixtures. The degree of hydrophilicity can be regulated by the choice of the components (A) and (B) and, if appropriate, (V), (S) and (F).

The hyperbranched polyesters of the present invention have essentially no intermolecular crosslinking. They have particularly low proportions of resinous components and discoloration.

A further aspect of the present invention is the use of the hyperbranched, water-soluble polyesters of the present invention for producing adhesives, printing inks such as flexographic and/or gravure printing inks, coatings, paints and varnishes. They are naturally particularly useful for water-based products. Adhesive layers, printing, coatings or paint/varnish layers comprising the hyperbranched polyesters of the present invention display excellent adhesion to a wide variety of substrates.

For this purpose, the hyperbranched polyesters can be used as such or else they can advantageously be used for preparing polyaddition or polycondensation products, for example polycarbonates, polyesters, polyamides, polyurethanes and polyethers which can in turn be processed further to give the abovementioned products. Preference is given to using hydroxyl-terminated, high-functionality, hyperbranched polyesters according to the present invention for preparing polyaddition or polycondensation products, e.g. polycarbonates, polyesters or polyurethanes.

The process of the present invention is highly flexible: a large number of widely differing products can be obtained by means of the process of the present invention from only few components by using the building block principle. The process thus allows particularly good matching of the desired product properties to the respective desired application.

The following examples illustrate the invention:

List of chemicals and abbreviations used:

| | |
|---|---|
| PG-3 | polyglycerol-3 (from Solvay) |
| TMPEO | ethoxylated trishydroxymethylpropane (Lupranol ® VP 9266, BASF) |
| GlyEO | ethoxylated glycerol (Lupranol ® VP 9209, BASF) |
| Novozym ® 435 | lipase from *Candida antarctica* B on a solid support, from Novozymes Biotech Inc., Denmark |
| Fascat ® | di-n-butyltin oxide (4201 E-Coat, Elf Atochem) |

EXAMPLE 1

Adipic Acid/PG-3, Enzymatic Catalysis

Adipic acid (88 g, 0.60 mol) and PG-3 (120 g, 0.44 mol) were dissolved at 70° C. while stirring in 80 ml of toluene under reduced pressure in a three-neck flask equipped for reactions. 14 g of the enzyme catalyst Novozym® 435 were added and polymerization was carried out at 70° C. under reduced pressure (300 mbar) to remove the water formed during the polycondensation. The water was separated from the toluene which likewise distilled off in a distillation apparatus for azeotropic distillation and the toluene was returned to the reactor.

After a reaction time of 9 hours, the reaction solution was filtered to separate off the supported enzyme. The toluene was subsequently removed on a rotary evaporator and the last traces of toluene were removed in a high vacuum (<10 mbar) at from 50 to 100° C.

This gave a honey-like, viscous, colorless to slightly yellowish hyperbranched polyester. The polyester was very readily soluble in water. The properties of the polyester obtained are summarized in table 2.

EXAMPLE 2

Adipic Acid/PG-3, Acid Catalysis

Adipic acid (1306 g, 8.95 mol) and PG-3 (1774 g, 7.45 mol) were melted at 130° C. with stirring under reduced pressure in a three-necked flask equipped for reactions. 2.05 g of the acid catalyst Fascat® were added, and polymerization was carried out at 130° C. under reduced pressure (50 mbar) in order to remove the water formed during the polycondensation.

After a reaction time of 9 hours, a honey-like, viscous, colorless to slightly yellowish hyperbranched polyester had been obtained. The polyester was very readily soluble in water. The properties of the polyester obtained are summarized in table 2.

EXAMPLE 3

Adipic Acid/TMPEO, Enzymatic Catalysis

Adipic acid (22 g, 0.15 mol) and TMPEO (198 g, 0.295 mol) were reacted while stirring in 25 ml of toluene as described in example 1. 7 g of the enzyme catalyst Novozym® 435 were used and the reaction was carried out at a pressure of from 200 to 250 mbar.

After a reaction time of 16 hours, the hyperbranched polyester was worked up as described.

The properties of the polyester obtained are summarized in table 2.

EXAMPLE 4

Adipic Acid/TMPEO, Acid Catalysis

Adipic acid (51.9 g, 0.355 mol) and TMPEO (198 g, 0.295 mol) were reacted as described in example 2. 0.20 g of Fascat® were used and the reaction was carried out at a pressure of 70 mbar.

The reaction time was 23 hours. The properties of the polyester obtained are summarized in table 2.

EXAMPLE 5

Adipic Acid/GlyEO, Enzymatic Catalysis

Adipic acid (29.3 g, 0.20 mol) and GlyEO (62.3 g, 0.17 mol) were reacted while stirring in 25 ml of toluene as described in example 1. 7 g of the enzyme catalyst Novozym® 435 were used and the reaction was carried out at a pressure of from 200 to 250 mbar.

After a reaction time of 16 hours, the hyperbranched polyester was worked up as described.

The properties of the polyester obtained are summarized in table 2.

EXAMPLE 6

Adipic Acid/GlyEO, Acid Catalysis

Adipic acid (80 g, 0.55 mol) and GlyEO (169.6 g, 0.46 mol) were reacted as described in example 2. 0.60 g of Fascat® were used and the reaction was carried out at a pressure of 60 mbar.

The reaction time was 22 hours. The properties of the polyester obtained are summarized in table 2.

EXAMPLE 7

Adipic Acid/PG-3/Stearic Acid as Chain Stopper (S), Acid Catalysis

Adipic acid (99 g, 0.68 mol), PG-3 (135 g, 0.56 mol) and stearic acid (15.8 g; 0.056 g corresponding to 8.2 mol % based on adipic acid) were melted at 100° C. as described in example 2. 0.16 g of Fascat® were added and polymerization was carried out at a pressure of 60 mbar and a temperature of 130° C.

The reaction time was 8 hours. A wax-like, hyperbranched polyester was obtained. The properties of the polyester obtained are summarized in table 2.

EXAMPLE 8

Adipic Acid/PG-3/Glyceryl Monostearate as Chain Extender (V), Acid Catalysis

Adipic acid (99 g, 0.55 mol), PG-3 (135 g, 0.56 mol) and glyceryl monostearate (20.1 g; 0.056 mol corresponding to 10 mol % based on PG-3) were melted at 130° C. as described in example 2. 0.16 g of Fascat® was added and polymerization was carried out at a pressure of 60 mbar and a temperature of 130° C.

The reaction time was 15 hours. The properties of the polyester obtained are summarized in table 2.

EXAMPLE 9

Adipic Acid/PG-3/Ethylene Glycol as Chain Extender (V), Acid Catalysis

Adipic acid (102.6 g, 0.70 mol), PG-3 (150 g, 0.625 mol) and ethylene glycol (2.65 g; 0.043 mol corresponding to 6.9 mol % based on PG-3) were melted at 130° C. as described in example 2. 0.17 g of Fascat® was added and polymerization was carried out at a pressure of 60 mbar and a temperature of 130° C.

The reaction time was 21 hours. The properties of the polyester obtained are summarized in table 2.

EXAMPLE 10

Phthalic Anhydride/PG-3, Acid Catalysis

Phthalic anhydride (99.2 g, 0.67 mol) and PG-3 (150.8 g, 0.625 mol) were melted at 130° C. in the apparatus described in example 2. 0.20 g of Fascat® was added and polymerization was carried out at a pressure of 150 mbar and a temperature of 150° C. After a reaction time of 16 hours, the pressure was reduced to 50 mbar and polymerization was continued for a further 3 hours at this pressure.

The properties of the polyester obtained are summarized in table 2.

EXAMPLE 11

Cyclohexane-1,2-dicarboxylic anhydride/PG-3, Acid Catalysis

Cyclohexane-1,2-dicarboxylic anhydride (101.6 g, 0.695 mol) and PG-3 (148 g, 0.62 mol) were melted at 130° C. in the apparatus described in example 2. 0.30 g of Fascat® was added and polymerization was carried out at atmospheric pressure and a temperature of 150° C. After a reaction time of 4.5 hours, the pressure was reduced to 60 mbar and polymerization was continued for a further 9 hours at this pressure.

The properties of the polyester obtained are summarized in table 2.

COMPARATIVE EXAMPLE 1

Without Polyether Polyol

Adipic Acid/Trimethylolpropane/Acid Catalysis

Adipic acid (702 g, 4.8 mol), trimethylolpropane (537 g, 4 mol), 2.4 g of Fascat® and 200 g of toluene were heated to 125–130° C. under nitrogen and water formed was separated off using a water separator. After a reaction time of 11 hours, the toluene was distilled off under reduced pressure. The viscous, hyperbranched polyester was soluble in butyl acetate or THF but insoluble in water.

The physical and chemical properties of the hyperbranched polyesters obtained are summarized in table 2.

TABLE 2

Physical and chemical properties of the hyperbranched polyesters obtained in the examples The acid number was determined in accordance with DIN 53402.

| Example | Viscosity | Acid number [mg of KOH/g of polyester] | $M_n$ [g/mol] | $M_w$ [g/mol] | $M_w/M_n$ | Solubility in water |
| --- | --- | --- | --- | --- | --- | --- |
| 1 | 4.3 poise (at 75° C.) | 37 | 3400 | 5300 | 1.6 | Very good |
| 2 | 2.7 poise (at 75° C.) | 117 | 1450 | 2220 | 1.5 | Very good |
| 3 | 10.0 poise (at 50° C.) | 9 | 8000 | 24000 | 3.0 | Good |
| 4 | 3.3 poise (at 25° C.) | 50 | 2340 | 5860 | 2.5 | Good |
| 5 | 6.4 poise (at 50° C.) | 63 | 6600 | 28500 | 4.3 | Good |
| 6 | 7.2 poise (at 25° C.) | 45 | 2530 | 5700 | 2.3 | Good |
| 7 | 4.0 poise (at 75° C.) | 104 | 2300 | 3330 | 1.4 | Dispersible |
| 8 | 2.0 poise (at 75° C.) | 66 | 2500 | 4080 | 1.6 | Dispersible |
| 9 | 6.1 poise (at 75° C.) | 48 | 3100 | 44400 | 14.3 | Very good |
| 10 | 1.7 poise (at 125° C.) | 76 | n.d. | n.d. | n.d. | Dispersible |
| 11 | 8.2 poise (at 100° C.) | 71 | n.d. | n.d. | n.d. | Dispersible |
| C1 | n.d. | 77 | 1620 | 16170 | 9.9 | Insoluble |

$M_w$ and $M_n$ were determined by gel permeation chromatography in THF or dimethylacetamide at 35° C. using PMMA as standard.
n.d.: not determined

We claim:

1. A process for preparing essentially uncrosslinked hyperbranched, water-soluble or water-dispersible polyesters by reacting at least one dicarboxylic acid or a dicarboxylic acid derivative (A) with
at least one polyether polyol (B) having n OH groups where n is $\geq 3$, and
at least one saturatured monocarboxylic acid, or at least one monofunctional alcohol as a chain stopper (S)
at from 40° C. to 160° C. in the presence of an esterification catalyst, where the components (A) and (B) are used in such amounts that the molar ratio of OH groups to COOH groups is from 2:1 to 1:2.

2. A process as claimed in claim 1, wherein n is 3, 4, 5 or 6.

3. A process as claimed in claim 1, wherein n is 3 or 4.

4. A process as claimed in claim 1, wherein the molar ratio of OH groups to COOH groups is from 1.8:1 to 1:1.8.

5. A process as claimed in claim 1, wherein the molar ratio of OH groups to COOH groups is from 1.5:1 to 1:1.5.

6. A process as claimed in claim 1, wherein the reaction is carried out under reduced pressure.

7. A process as claimed in claim 6, wherein the pressure is less than 500 mbar.

8. A process as claimed in claim 1, wherein the polyether polyol having at least 3 OH groups is obtainable by ethoxylation and/or propoxylation of a molecule having at least 3 acidic H atoms.

9. A process as claimed in claim 8, wherein an ethoxylation is carried out.

10. A process as claimed in claim 1, wherein a dial is additionally used as chain extender (V) in an amount of not more than 40 mol % based on the amount of polyether polyols used.

11. A process as claimed in claim 10, wherein the amount of the chain extender (V) is not more than 20 mol %.

12. A process as claimed in claim 1, wherein the saturated monofunctional carboxylic acid or the monofunctional alcohol is additionally used as chain stopper (S) in an amount of not more than 10 mol % based on the amount of polyether polyols (B) or dicarboxylic acids (A) used.

13. A process as claimed in claim 12, wherein the amount of the chain stopper (S) is not more than 5 mol %.

14. A process as claimed in claim 1, wherein the hyperbranched, water-soluble or water-dispersible polyester obtained is reacted in an additional process step with a suitable functionalization reagent (F) which can react with the OH and/or COOH end groups of the polyester.

15. A process as claimed in claim 14, wherein the functionalization reagent (F) comprises one or more compounds selected from the group consisting of aliphatic and aromatic monocarboxylic acids and their derivatives, aliphatic and aromatic unsaturated monocarboxylic acids and their derivatives, aliphatic and aromatic monoalcohols, aliphatic and aromatic unsaturated monoalcohols, aliphatic and aromatic monoamines, aliphatic and aromatic unsaturated monoamines, aromatic and aliphatic monoisocyanates, aliphatic and aromatic unsaturated monoisocyanates, compounds containing carbodiimide groups and compounds containing epoxide groups.

16. A process as claimed in claim 1, wherein the esterification catalyst is an enzyme and the polymerization is carried out at from 40° C. to 120° C. in the presence of a solvent.

17. A process as claimed in claim 16, wherein the polymerization is carried out at from 50° C. to 80° C.

18. A process as claimed in claim 16, wherein the enzyme is a lipase or an esterase.

19. A process as claimed in claim 18, wherein the enzyme is *Candida antarctica* lipase B.

20. A process as claimed in claim 16, wherein the enzyme is used in immobilized form.

21. A process as claimed in claim 1, wherein the esterification catalyst is an acidic inorganic, organometallic or organic catalyst.

22. A process as claimed in claim 21, wherein the reaction is carried out at from 60° C. to 160° C.

23. A process as claimed in claim 22, wherein the reaction is carried out at from 80° C. to 150° C.

24. A process as claimed in claim 21, wherein the reaction is carried out at a pressure of not more than 100 mbar.

25. A water-soluble or water-dispersible, hyperbranched polyester obtainable by a process as claimed in claim 1.

26. A water-soluble or water-dispersible, hyperbranched polyester which has a hydroxyl number of 50–1000 mg KOH/g, an acid number of 0–200 mg KOH/g, a number average molecular weight $M_n$ of 300–15000 g/mol and a polydispersity $M_w/M_n$ of 1.1–50 and is obtainable by a process as claimed in claim 1.

27. A water-soluble or water-dispersible, hyperbranched polyester as claimed in claim 26 which has a hydroxyl number of 100–800 mg KOH/g, an acid number of 1–100 mg KOH/g, a number average molecular weight $M_n$ of 500–8000 g/mol and a polydispersity $M_w/M_n$ of 1.2–20.

28. A method for preparing a polyaddition or a polycondensation polymer comprising synthesizing the polyaddition or the polycondensation polymer with the water-soluble or water dispersable, hyperbranched polyester as claimed in claim 25.

29. A method for producing a printing ink, an adhesive, a coating, a paint or a varnish comprising adding the water-soluble or water-dispersable, hyperbranched polyester as claimed in claim 25 to a printing ink formulation, an adhesive formulation, a coating formulation, a paint formulation or a varnish formulation.

* * * * *